Oct. 9, 1962   J. J. KERLEY, JR   3,057,593
SHOCK AND VIBRATION MOUNTS OF THE CABLE SUPPORT TYPE
Filed Oct. 27, 1959
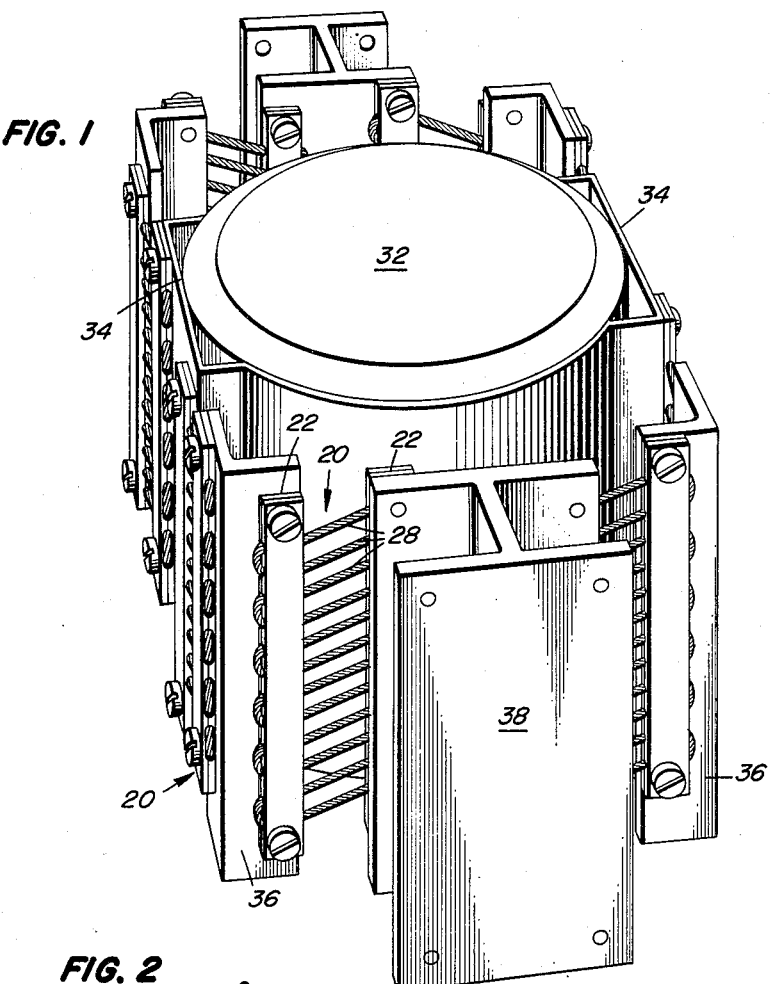
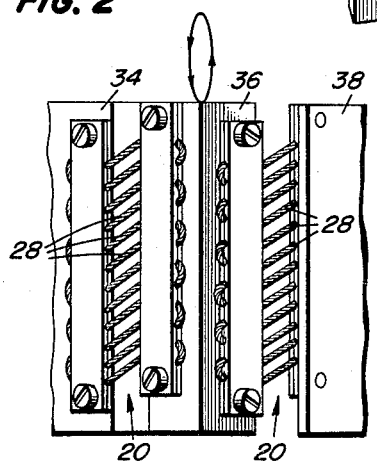
INVENTOR
James J. Kerley, Jr.
BY  Walter G. Finch
ATTORNEY

United States Patent Office 3,057,593
Patented Oct. 9, 1962

3,057,593
SHOCK AND VIBRATION MOUNTS OF THE CABLE SUPPORT TYPE
James J. Kerley, Jr., Cheverly, Md., assignor to Kerley Engineering, Inc., College Park, Md., a corporation of Maryland
Filed Oct. 27, 1959, Ser. No. 849,013
2 Claims. (Cl. 248—358)

This invention relates generally to vibration supports, and more particularly it pertains to shock and vibration mounts of the cable support type for isolating a mass from shock and vibration forces.

In shock and vibration isolation systems, advantage is often taken of the inertia of the isolated mass or attached structure to filter and gradually absorb the energy. All three axes of resistance to motion have been exploited. There remains another inertia opposing force which is of the rotational type. A helical spring mount is of this class. However, its employment in the past leaves much to be desired in performance.

Accordingly, it is an object of this invention to provide a cable support shock and vibration mount which functions in a twist mode of operation.

Another object of this invention is to provide a rectangular embracing shock absorbing structure operating in a torsion mode.

And yet another object of this invention is to provide an improved vibration isolating cable arrangement giving support at right angles and having unique energy absorbing properties.

These and other objects and advantages of this invention will become more readily apparent and understood from the accompanying specifications and drawings in which:

FIG. 1 is a perspective view of a shock and vibration mount incorporating features of this invention; and FIG. 2 is a bisecting oblique view in one plane of a typical corner of the shock and vibration mount of FIG. 1 illustrating the mode of operation thereof.

Referring now to FIG. 1 of the drawing, there is shown generally a vibration isolator 20. Vibration isolator 20 is made up of a plurality of passes of a resilient cable 28, which is preferably of twisted multi-strand type, and of a pair of comb strips 22.

The cable 28 is reeved back and forth at a common angle, as shown, and other than perpendicular between the pairs of comb strips 22 which may be grooved or drilled to accommodate the passes of resilient cable 28 and direct their angularity. The cable is frictionally engaged in the comb strips so that their structural arrangement as shown in the drawings is maintained under vibration and shock.

Eight of these vibration isolators 20 are arranged so that their cables 28 all slope the same way around an isolated mass which may be an electronic unit 32. Electronic unit 32 is provided with a pair of U-shaped support brackets 34 which are diametrically opposed from each other. A vibration isolator 20 is secured to each side of the brackets 34. One each of the remaining vibration isolators 20 is secured to each flanged side of a pair of structural T or H beam supports 38.

The free ends of the vibration isolators 20 extending from the brackets 34 and supports 38 are then joined in pairs at right angles by means of a structural angle 36 making a corner assembly, best seen in FIG. 2.

To visualize a half cycle of operation, the supports 38 should be imagined moving downward in vibration or shock. As shown in FIGURE 2 by the elliptic locus of progressive displacement vectors from an initial quiescent position assumed at the top of the ellipse, angle member 38 first moves outwardly and downwardly due to a leveling of the passes of cable 28, first for those on the right and then for those on the left due to inertia of angle 36 and the structure attached thereto.

This produces a sideward thrust component of motion on bracket 34 which is opposed by the torsional inertia of the unit 32 secured on bracket 34 and the corner structural angle 36 is given an opposing restoring force which tends to center it again between bracket 34 and support 38. With no place to go since the cables 28 on both sides are nearly horizontal, the structural angle 36 is forced outwardly with respect to unit 32. As unit 32 responds to the sideward thrust, it rotates clockwise as viewed from above, so that angle 36 then begins to move inwardly.

A similar action, but in opposite sense, meanwhile is taking place to the right of the near support 38 in FIG. 1. Here cable action results in an effective shortening and the right hand corner angle 36 moves initially downwardly and inwardly following a similar elliptic motion but in the opposite direction.

Thus, it can be seen that the elliptical vectors for all corner structural angles 36 are in phase either clockwise or counterclockwise but every other angle 36, counting around the structure absorbs the energy by outward or inward motion as the case may be to effectively isolate the unit 32. Simultaneously, unit 32 executes small oscillations around a vertical axis accompanied by small cyclic vertical movement.

Obviously, many other modifications and variations of the present invention are possible in light of the above teachings. It is, therefore, to be understood that within the scope of the appended claims the invention may be practiced otherwise than as specifically described.

What is claimed is:

1. A shock and vibration isolating assembly comprising a mass, support means positioned at opposite sides of the mass, a pair of reeved cable isolators mounted in alignment on each support and extending on opposite sides therefrom, two pairs of aligned reeved cable isolators attached to the mass in opposite positions, extending transversely in relation to the plane of the first-recited isolators and connected therewith remotely of the mass and support means, each reeved cable isolator comprising a pair of parallel mounting strip means and lengths of cable forming parallel connecting passes between the pair of parallel mounting strip means, each mounting strip means embracing the cable lengths at each end of each pass, the passes being positioned parallel at a common angle substantially less than 90 degrees to the mounting strip means, all said isolators being mounted so their cable passes are similarly inclined to the proximate mounting strips of adjacent isolators.

2. The structure defined in claim 1 in which the cable passes of each isolator normally lie in a common vertical plane.

References Cited in the file of this patent

UNITED STATES PATENTS

| Re. 22,280 | Lord | Mar. 2, 1943 |
| 2,873,109 | Hartenstein | Feb. 10, 1959 |

FOREIGN PATENTS

| 312,808 | Great Britain | June 6, 1929 |